United States Patent [19]

Maruyama et al.

[11] Patent Number: 5,633,852
[45] Date of Patent: May 27, 1997

[54] OPTICAL DATA RECORDING AND REPRODUCING APPARATUS INCLUDING CHROMATIC ABERRATION CORRECTION

[75] Inventors: Koichi Maruyama; Junji Kamikubo, both of Tokyo, Japan

[73] Assignee: Asahi Kogaku Kogyo Kabushiki Kaisha, Tokyo, Japan

[21] Appl. No.: 409,688

[22] Filed: Mar. 23, 1995

[30] Foreign Application Priority Data

Mar. 24, 1994 [JP] Japan .................. 6-053776
Jul. 13, 1994 [JP] Japan .................. 6-161015

[51] Int. Cl.$^6$ ............................... G11B 7/00
[52] U.S. Cl. ................................ 369/112; 369/44.23
[58] Field of Search ........................ 369/112, 109, 369/110, 120, 44.23, 44.24

[56] References Cited

U.S. PATENT DOCUMENTS

| | | | |
|---|---|---|---|
| 4,210,391 | 7/1980 | Chen | 359/743 |
| 4,909,616 | 3/1990 | Arai | 359/644 |
| 5,173,809 | 12/1992 | Iwaki et al. | 359/784 |
| 5,214,537 | 5/1993 | Maruyama | 359/644 |
| 5,321,550 | 6/1994 | Maruyama et al. | 359/618 |
| 5,446,565 | 8/1995 | Komma et al. | 369/112 |
| 5,481,386 | 1/1996 | Shimano et al. | 369/109 |

FOREIGN PATENT DOCUMENTS

| | | | |
|---|---|---|---|
| 62-269922 | 11/1987 | Japan . | |
| 2-308431 | 12/1990 | Japan | 369/44.23 |
| 3155514 | 7/1991 | Japan . | |
| 6242373 | 9/1994 | Japan . | |

*Primary Examiner*—Nabil Hindi
*Attorney, Agent, or Firm*—Greenblum & Bernstein P.L.C.

[57] ABSTRACT

An optical data recording and reproducing apparatus includes a laser source, a collimating lens made of a single lens having a positive power to collimate the divergent laser beams emitted from the laser source, and an objective lens which is to converge the collimated light onto a data recording surface of a data recording medium. The chromatic aberration of the objective lens is corrected to reduce the back focal distance thereof as the wavelength increases to cancel the chromatic aberration of the collimating lens.

6 Claims, 12 Drawing Sheets

OPTICAL DATA RECORDING AND REPRODUCING APPARATUS INCLUDING CHROMATIC ABERRATION CORRECTION

BACKGROUND OF THE INVENTION

1. Field of the Invention

The present invention relates to an apparatus which optically records and reproduces data.

2. Description of Related Art

In a conventional optical system for recording and reproducing data, divergent light emitted from a laser source is collimated by a collimating lens having a positive power, so that the collimated light is converged onto a data recording surface of a data recording medium by an objective lens. Light reflected by the data recording surface passes through the objective lens and is separated from the incident light path by a beam separator to converge onto a light receiving element. The light receiving element detects a focus error signal, a tracking error signal, and a data signal, etc., from the reflected light received by the light receiving element. In general, a relatively inexpensive semiconductor laser in which modulation can be easily carried out is used as the laser source. However, the wavelength of the laser beams emitted from the semiconductor laser varies due to a mode hopping phenomenon which occurs when the output power thereof varies. Consequently, if the power of the semiconductor laser changes between a recording operation and a reading operation, a change in the wavelength takes place.

Accordingly, it is necessary to correct chromatic aberrations while not causing a deviation of the focus on the data recording surface, even if the wavelength varies. To this end, in a conventional optical system, both the collimating lens and the objective lens are each subject to a correction of chromatic aberrations. However, the operation or treatment to correct the chromatic aberrations of both the collimating lens and the objective lens is rather expensive and increases the size of the entire lens system.

For example, in an arrangement proposed in Japanese Unexamined Patent Publication (Kokai) No. 62-269922, the objective lens is made of a single lens to reduce weight. Chromatic aberration caused in the objective lens is corrected by the collimating lens. However, in such an optical arrangement of an optical data recording and reproducing apparatus, the power of the objective lens is approximately three times the power of the collimating lens; a slight inclination or deviation of the optical axis of the collimating lens causes a considerable transverse chromatic aberration. Consequently, if there is a change in the wavelength, the deviation of a beam spot position on the data recording surface occurs. This makes it difficult to adjust the position of the collimating lens.

There is also known an optical system in which a beam separator is provided between the objective lens and the collimating lens to separate return light reflected from the data recording surface from light incident on the recording surface. The return light thus separated can be received by a light receiving element through a condenser lens. In this optical system, in the case where the condenser lens is made of a single lens, if the collimating lens has a large chromatic aberration, a change of a focus error signal occurs when the wavelength varies. Namely, resultant chromatic aberration of the collimating lens and the objective lens is corrected and a position of the objective lens is controlled in in-focus condition by a servo-controlled auto focus mechanism. When the wavelength varies, the control of the auto focus mechanism is effected such that the objective lens is out of focus. Because the return light reflected from the data recording surface is adversely affected by the chromatic aberrations of the objective lens, the focus error signal varies. To eliminate this drawback, the chromatic aberration of the condenser lens must be excessively corrected, similarly to the collimating lens, which requires an expensive operation.

SUMMARY OF THE INVENTION

The primary object of the present invention is to provide an optical data recording and reproducing apparatus in which the chromatic aberrations are easily corrected. No outstanding deviation of the beam spot position on the data recording surface is caused by a slight inclination or shift of the optical axis of the collimating lens of the present invention.

Another object of the present invention is to provide an optical data recording and reproducing apparatus including a beam separator provided between the collimating lens and the objective lens to separate return light beams reflected from a data recording surface from light incident to the recording surface. The separated return light beams are received by a light receiver through a condenser lens, and no chromatic aberration correction of the condenser lens is needed.

The above-mentioned objects are achieved by correcting the chromatic aberrations of the collimating lens by the objective lens. Namely, according to the present invention, there is provided an optical data recording and reproducing apparatus comprising a laser source, a collimating lens having a positive power to collimate the divergent laser beams emitted from the laser source, and an objective lens adapted to converge the collimated light onto a data recording surface of a data recording medium. The collimating lens is made of a single lens and the chromatic aberration of the objective lens is over-corrected to reduce the back focal distance thereof as the wavelength increases to cancel chromatic aberration of the collimating lens.

Preferably, a beam separator is provided between the collimating lens and the objective lens to separate return beams reflected from the data recording surface from incident beams path incident upon the data recording surface.

In this arrangement, according to another aspect of the present invention, the apparatus meets the requirements defined by the following formulae:

$$f1 < f3, \text{ and} \tag{1}$$

$$v1 > v3, \tag{2}$$

where f1 represents a focal length of the collimating lens, f3 represents a focal length of the condenser lens, v1 represents an Abbe number of the collimating lens, and v3 represents an Abbe number of the condenser lens.

A condenser (collective) lens is provided in the optical path for the separated return beams to form an image of the return beams onto a light receiving element. The condenser lens can be made of a single lens.

Preferably, the objective lens is made of a single lens having at least one diffracting lens surface having a pattern of stepped concentrical rings, so that the boundaries of the stepped concentrical rings have a stepped discontinuous cross section. At the boundaries, outer thicknesses are larger than inner thicknesses.

The present disclosure relates to subject matter contained in Japanese patent application Nos. 06-53776 (filed on Mar.

24, 1994) and 06-161015 (filed on Jul. 13, 1994) which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
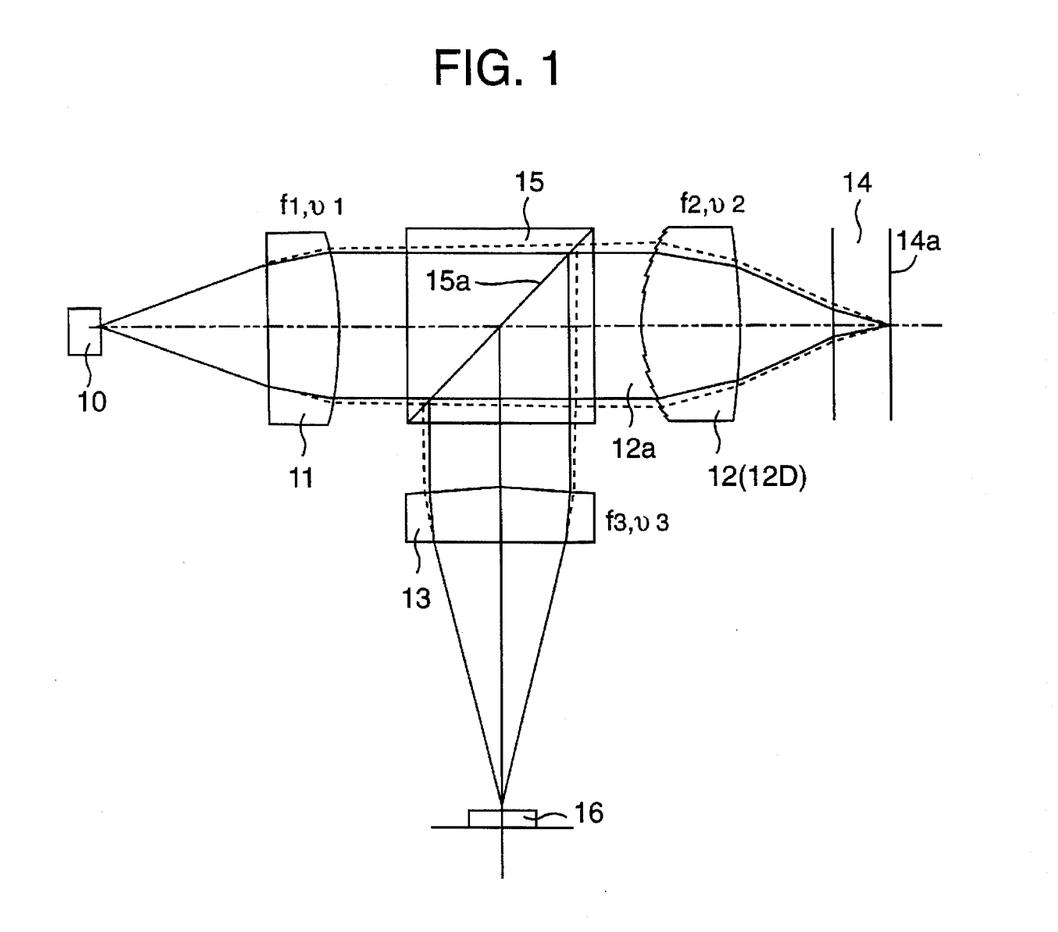
FIG. 1 is a conceptual view of an optical system in an optical data recording and reproducing apparatus according to the present invention.

With reference to FIG. 1, which shows the principle of an optical data recording and reproducing apparatus according to the present invention, laser beams emitted from a semiconductor laser 10 are collimated by a collimating lens 11, transmitted through a beam separator (beam separating element) 15, and converged by an objective lens 12 to form an image on a data recording surface 14a (rear surface) of an optical disc 14. The light reflected by the data recording surface 14a is refracted again by the objective lens 12 and reflected by a reflecting surface 15a of the beam separator 15 toward a condenser lens 13. Consequently, the light gathered by the condenser lens 13 is incident upon a focus error detecting light receiving element 16. Data signals and tracking error signals are detected by a light receiver provided in an optical path separated by a beam separator. Alternatively, it is also possible to detect the data signals and tracking error signals by the focus error detecting light receiving element 16. The electrical signals produced by the light receiving element are computed by an operating means (not shown) to produce a focus error signal. In accordance with the focus error signal, the driving system of the objective lens 12 is servo-controlled, so that data signals can be detected in a state having no focusing error. The basic optical system mentioned above, the servo-mechanism of the objective lens 12, and the light receiving element 16 are all known in the prior art.

On the assumption that the focal lengths and Abbe numbers of the collimating lens 11, the objective lens 12, and the condenser lens 13 are f1, v1; f2, v2; and f3, v3, respectively, the image magnification m is determined by m=f2/f1, provided that the light between the collimating lens 11 and the objective lens 12 is collimated. Note that the "Abbe numbers" do not refer to the glass material which constitutes the lenses 11, 12 or 13 but that of the lenses 11, 12, or 13 as a whole. For example, v2 does not only refer to glass material of the objective lens 12 but includes the diffracting element.

Assuming that the deviation of focus ("out of focus") due to axial chromatic aberration when the collimated light is incident upon the collimating lens 11 from the emitting surface side thereof is $\Delta$, if there is no chromatic aberration by the objective lens 12, the focus deviation at an image forming point of the objective lens is approximately $\Delta m^2$.

An axial chromatic aberration of a single lens is proportional to a focal length of the lens and inversely proportional to the Abbe number thereof. Namely, the chromatic aberrations of the collimating lens 11 and the objective lens 12 are represented by $\alpha \cdot f1/v1$ and $\alpha \cdot f2/v2$, respectively, wherein $\alpha$ is a proportional constant.

When light is emitted from the objective lens 12, the chromatic aberration due to the axial chromatic aberration of the collimating lens 11 is defined as follows:

$$\alpha(f1/v1) \times m^2 = \alpha(f1/v1) \times (f2/f1)^2 = \alpha(f2)^2/(v1 \times f1).$$

To cancel this chromatic aberration using the chromatic aberration ($=\alpha \cdot f2/v2$) of the objective lens 12, the following relationship should be satisfied:

$$\alpha f2/v2 = -\alpha(f2)^2/(v1 \times f1),$$

$$\therefore f1 \cdot v1 = -f2 \cdot v2.$$

It can be understood from this formula that no focus deviation occurs on the data recording surface 14a of the optical disc 14 due to the change in the wavelength when the chromatic aberrations cancel in the state where the Abbe number of one of the collimating lens 11 and the objective lens 12 is a negative value (i.e., a state of over correction of the chromatic aberration).

In the optical system as discussed above, according to the improvement of the present invention, to eliminate the focus deviation caused by the change in the wavelength, the collimating lens 11 is made of a single lens, and the chromatic aberration of the objective lens is over-corrected to reduce the back focal distance as the wavelength increases. Thus, the chromatic aberration of the collimating lens is cancelled.

The advantages of the optical system expected from the improvement will be discussed below.

If light emitted from the objective lens 12 is converged at a correct focal point onto, and reflected from, the data recording surface 14a of the optical disc 14, the return light from the objective lens 12 toward the condenser lens 13 travels along the same path as the incident light from the collimating lens 11 toward the objective lens 12. Assuming that the collimating lens 11 is adjusted to collimate light at a reference wavelength of the semiconductor laser 10, if the wavelength of the light emitted from the semiconductor laser 10 increase; the light emitted from the collimating lens 11 is slightly divergent. In the present invention, the divergent light is converged by an over correction (excess correction) of chromatic aberration by the objective lens 12, so that no deviation of an image to be formed on the data recording surface 14a of the optical disc 14 occurs.

Figure 2:
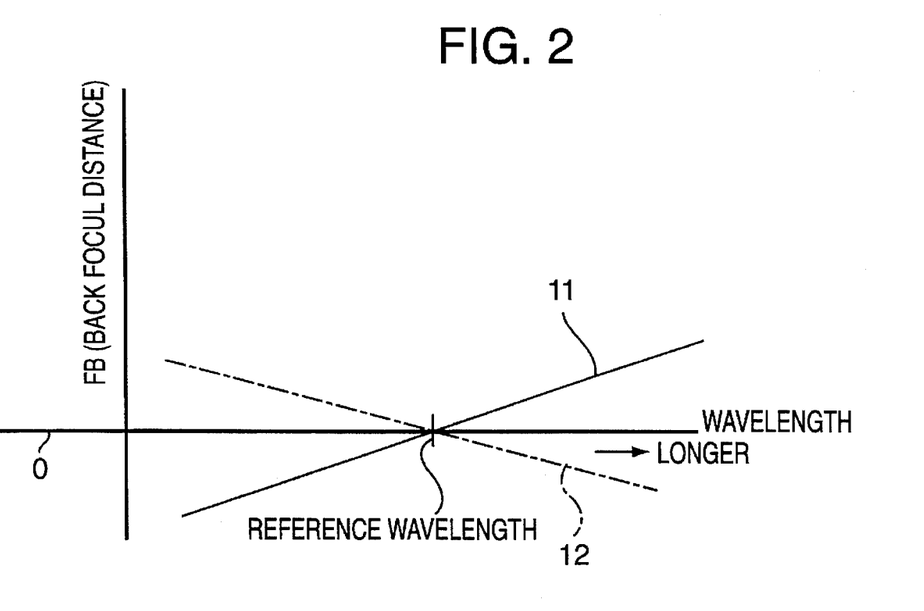
FIG. 2 is a diagram showing a relationship between the chromatic aberrations of a collimating lens and a correction of the chromatic aberrations of an objective lens, in the optical system shown in FIG. 1.

FIG. 2 shows a diagram of chromatic aberrations caused by the collimating lens 11 and an over correction of the chromatic aberrations by the objective lens 12. The focal length of the collimating lens 11, made of a single lens, increases as the wavelength is longer than the reference wavelength. The back focal distance fB, which is assumed to be zero at the reference wavelength, increases and decreases as the wavelength is longer and shorter than the reference wavelength, respectively. To eliminate the resultant chromatic aberration by the collimating lens 11 and the objective lens 12, the latter carries out an over correction of the chromatic aberrations to reduce the back focal distance as the wavelength increases.

If the objective lens 12 has such an excessively corrected chromatic aberration, it is necessary that the be no adverse influence on the focus error signal so long as there is no focus deviation on the data recording surface 14a of the optical disc 14. It is necessary to correct the chromatic aberrations in the composite optical system of the condenser lens 13 and the objective lens 12, as mentioned above. Because the objective lens 12 has an excessively corrected chromatic aberration, the condenser lens 13 and the collimating lens 11 can be made of a single lens which does not completely eliminate the chromatic aberrations. Since the chromatic aberration of the objective lens 12 is set in accordance with the collimating lens 11, the chromatic aberration of the condenser lens 13 can be determined only in accordance with the chromatic aberration of the collimating lens 11.

If a focusing beam spot is formed on the data recording surface 14a by the composite optical system of the condenser lens 13 and the objective lens 12, the chromatic aberration of the light emitted from the condenser lens 13, as influenced by the axial chromatic aberration caused by the collimating lens 11, is represented by:

$$-\alpha(f1/v1) \times m^2,$$

$$= -\alpha(f1/v1) \times (f3/f1)^2, \text{ and}$$

$$= -\alpha(f3)^2/(v1 \times f1).$$

To cancel this chromatic aberration with the chromatic aberration of the condenser lens 13, the following relationship should be satisfied.

$$\alpha f3/v3 = \alpha(f3)^2/(v1 \times f1)$$

Accordingly, we have:

$$f1 \cdot v1 = f3 \cdot v3.$$

Consequently, if the collimating lens 11 and the condenser lens 13 are both single lenses, the focal lengths and the Abbe numbers thereof are selected to meet the requirement defined by f1·vf3·v3 (=−f2·v2), and hence, no fluctuation of the focus error signal takes place when the image on the data recording surface 14a of the optical disc 14 is in focus. The servo system would otherwise control the objective lens 12 to bring the same into an out-of-focus state. Namely, no erroneous focusing of the focus detecting system due to the chromatic aberration occurs. In general, the value f3 of the condenser lens 13 is larger than the value f1 of the collimating lens 11 (f3>f1). This is to simplify the structure of the optical detector, and accordingly, the above-mentioned relationship can be satisfied when v1 is larger than v3 (v1>v3). Note that the above formula is an approximation for a thin lens; and in practice, a thick lens, such as an objective lens, may not necessarily satisfy the formula.

The above mentioned Japanese Unexamined Patent Publication No. 62-269922 discloses an optical arrangement corresponding to an optical system in which the objective lens 12 is made of a single lens which cannot completely eliminate the chromatic aberration, and the collimating lens 11 is subject to an over correction of the chromatic aberration so as to eliminate the resultant chromatic aberration of the collimating lens and the objective lens. However, in the optical system disclosed in JPP '922, if the condenser lens 13 is not subject to an over correction to correct the chromatic aberration caused by the composite optical system of the objective lens 12 and the condenser lens 13, the focus error signal fluctuates even when the image on the data recording surface 14a of the optical disc 14 is in focus. Namely, it is necessary for both the collimating lens and the condenser lens to be subject to an over correction of the chromatic aberration in the optical system disclosed in JPP '922, whereas only the objective lens 12 is subject to over correction of the chromatic aberration in the present invention. This results in a reduction of the manufacturing cost.

Moreover, in an arrangement in which a beam separator is provided between the semiconductor laser 10 and the collimating lens 11, if the collimating lens 11 carries out an over correction of the chromatic aberration, a slight inclination or deviation of the optical axis of the collimating lens causes a considerable transverse chromatic aberration due to the change in the wavelength. Consequently, there is a deviation of a beam spot position on the data recording surface of the optical disc. This problem is solved in the present invention in which an over correction of the chromatic aberration is effected by the objective lens 12. Namely, the adjustment of the position of the collimating lens 11 can be easily carried out.

Figure 3:
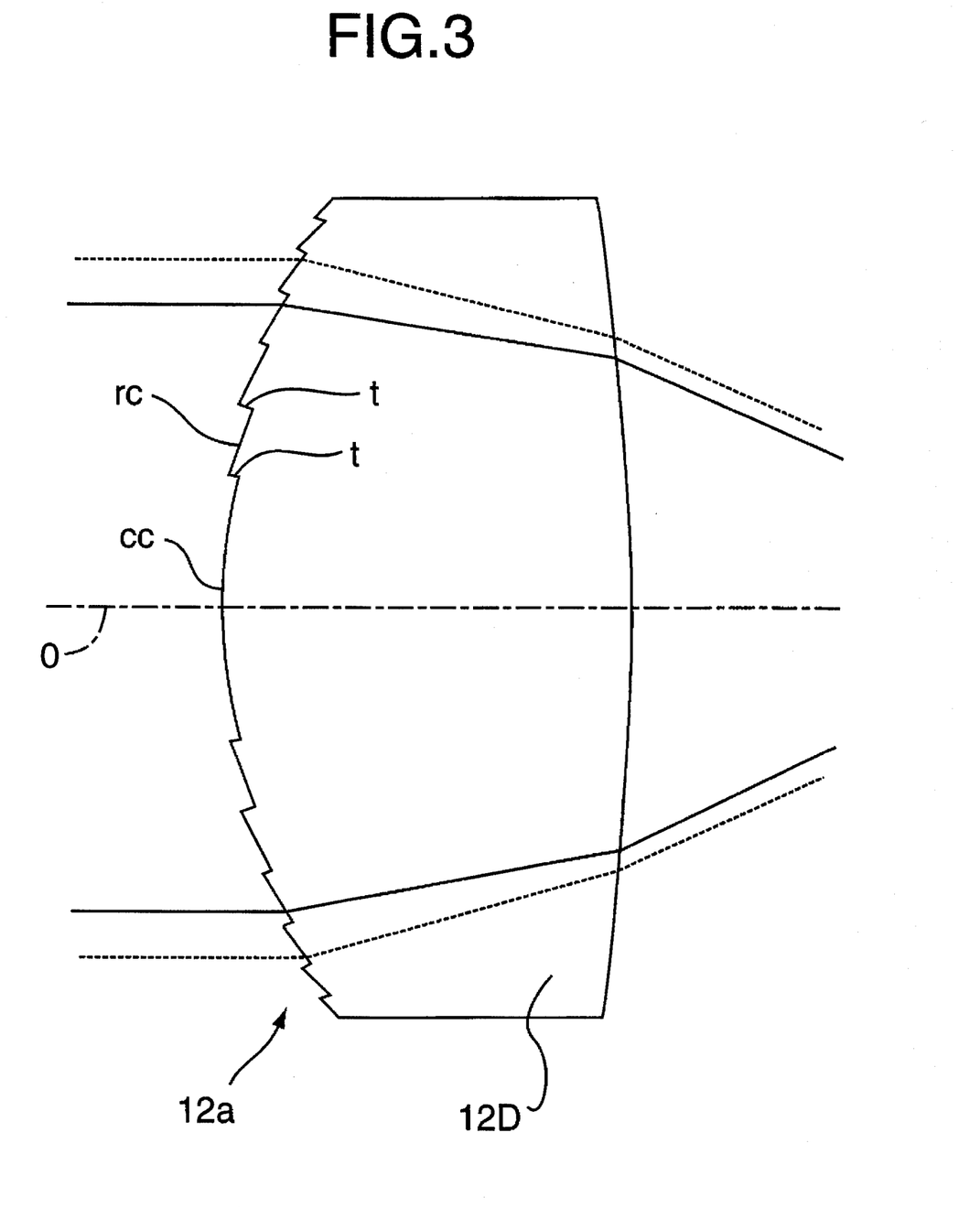
FIG. 3 is an enlarged schematic sectional view of a diffraction type of chromatic aberration correcting single lens.

In the embodiment illustrated in FIG. 1, to provide an optical property to perform an over correction of the chromatic aberration as shown in FIG. 2, the objective lens 12, which is made of a single lens, is provided with a diffracting lens surface 12a having a pattern of stepped concentrical rings, so that the chromatic aberration can be corrected by the diffraction. The diffraction type single chromatic aberration correcting lens 12D is the same as that disclosed in Japanese Unexamined Patent Publication No. 6-242373, which was filed in the name of the same assignee as the present application. Referring now to FIG. 3 the diffracting lens surface 12a is provided with a central circular incident surface section cc, and a plurality of stepped concentrical incident surface sections rc surrounding the central circular incident surface section cc. The step difference (height difference) "t" between the adjacent annular incident surface sections rc, and between the central incident surface section cc and the annular incident surface section rc adjacent to the central incident surface section CC in the radial direction is set such that when light whose wavelength is identical to the reference wavelength is made incident upon the respective incident surface sections cc and rc, there is no phase difference produced to the light. Conversely, when the light incident upon the respective incident surface sections cc and rc has a wavelength different from the reference wavelength, the light has a phase difference corresponding to the difference in wavelength, so that the beams of light can be converged or diverged. Namely, for the light whose wavelength is shorter than the reference wavelength, the degree of divergence increases as the wavelength becomes short, and for the light whose wavelength is longer than the reference wavelength, the degree of convergence increases as the wavelength becomes long, in accordance with the diagram shown in FIG. 2. To this end, the annular incident surface sections have a thickness which discretely or discontinuously increases as the distance from the optical axis O increases.

In the preferred embodiment of the invention, there is the following relationship:

$$0.8 \leq t(n-1)/\lambda \leq 10,$$

where "n" designates the refractive index of a glass material of which the objective lens 12 is made, "t" represents the height difference (step) between the adjacent annular incident surface sections in the optical axis direction, and "$\lambda$" represents the reference wavelength, respectively.

The pitch of the adjacent annular incident surface sections can be reduced substantially in inverse proportion to the square of the distance from the optical axis O.

It is possible to provide a chromatic aberration over-correcting element, such as a diffracting chromatic aberration correcting element, or a cemented lens, separate from the objective lens 12 to effect the over correction of the chromatic aberration. Alternatively, it is also theoretically possible to construct the objective lens with a combination of glass lenses to effect the over correction of the chromatic aberration. Note that in general, the wavelength of light emitted from the semiconductor laser 10 varies by around 30 nm in accordance with the change in the ambient temperature. Accordingly, the applicable wavelength bandwidth should take into account the change in the wavelength.

Figure 4:
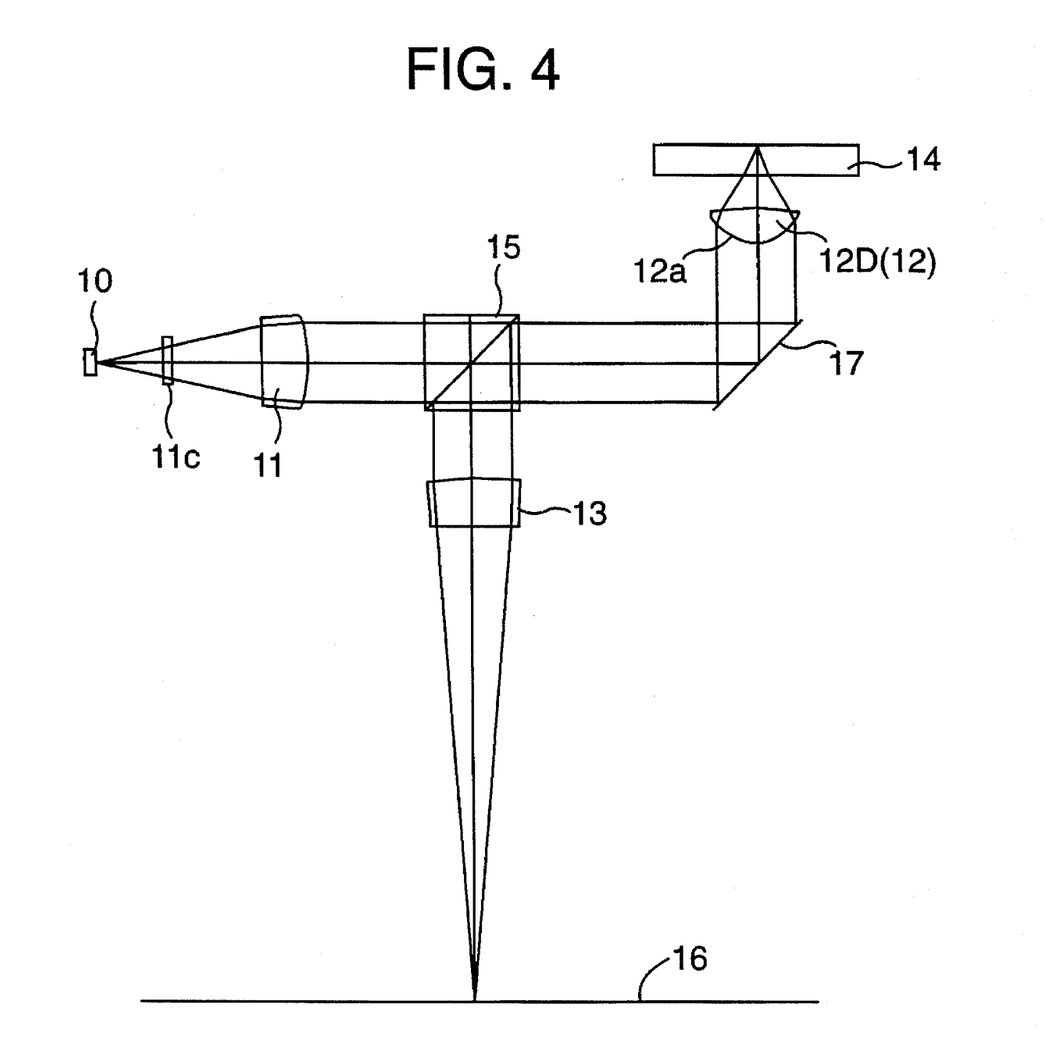
FIG. 4 is a schematic view of an optical system in an optical data recording and reproducing apparatus, according to a first embodiment of the present invention.

Several examples of numerical data are discussed below. In the following examples (Embodiments 1 through 4), the reference wavelength of the semiconductor laser 10 is 780 nm, and the plane-parallel glass cover 11c is provided between the collimating lens 11 and the semiconductor laser 10 as shown in FIG. 4. In FIG. 4, there is a mirror 17 situated between the collimating lens 11 and the objective lens 12 (diffraction type of single chromatic aberration correcting lens 12D). In the optical data recording and reproducing apparatus as mentioned above, in general, the mirror 17 and the objective lens 12 (diffraction type single chromatic aberration correcting lens 12D) are supported on a carriage (not shown) which moves in the radial direction of the optical disc 14.

In Tables below, "f" designates the focal length, "ri" represents the radius of curvature of each lens surface, "di" represents the lens thickness or the distance between the lenses, "N" represents the refractive index of the d-line, and "ν" represents the Abbe number of the d-line, respectively.

First Embodiment:

The objective lens 12 is made of a diffraction type single chromatic aberration correcting lens 12D. The surface shape of the diffracting lens surface 12a is represented by the following formula:

$$\Delta X(m) = \Delta t \times m + X(m),$$

wherein $\Delta X(m)$ designates the distance between the YZ plane including the origin at which the diffracting lens surface 12a intersects the optical axis O, and a point on the m-th (m step) annular incident surface sections (m=0, 1, 2, . . . ; m=0 on the optical axis) in the orthogonal coordinate in which the X-axis is identical to the optical axis, "t" represents the height of the annular incident surface sections in the optical axis direction. "X(m)" is defined by the following formula which represents an aspherical shape:

$$X = cH^2/\{1+[1-(1+K)c^2H^2]^{1/2}\}+A_4H^4+A_5H^6+A_8H^8+\ldots,$$

where

H represents a height above the axis,

X represents a distance from a tangent plane of an aspherical vertex, c represents a curvature of the aspherical vertex(1/r), K represents a conic constant, $A_4$ represents a fourth-order aspherical factor, $A_6$ represents a sixth-order aspherical factor, $A_8$ represents a eighth-order aspherical factor, $A_{10}$ represents a tenth-order aspherical factor.

Numerical data of the lenses in the first embodiment is shown in Tables 1, 2 and 3.

TABLE 1

Data of a collimating lens 11 (including glass cover 11 c)
f = 8.00 mm
Distance between a light emitting point of semiconductor laser 10 and the third surface of the lens: 7.00 mm.

| surface No. | r | d | N | ν |
|---|---|---|---|---|
| 1 | ∞ | 0.25 | 1.51072 | 64.1 |
| | | | (glass cover) | |
| 2 | ∞ | — | — | — |
| 3* | 13.337 | 2.00 | 1.43107 | 95.0 |
| 4* | −4.441 | — | — | — |

*marked surface is aspherical.
NO.3: K = 0.0, A4 = 0.0, A6 = 0.77473 × 10⁻⁶, A8 = 0.97834 × 10⁻⁷, A10 = 0.0.
NO.4: K = −0.7840, A4 = 0.26953 × 10⁻⁵, A6 = 0.54087 × 10⁻⁶, A8 = 0.41566 × 10⁻⁷, A10 = 0.93681 × 10⁻⁸.

TABLE 2

Data of a diffraction type single chromatic aberration correcting lens 12 D
f = 3.00 mm

| surface No. | r | d | N | ν |
|---|---|---|---|---|
| 1** | — | 1.50 | 1.51072 | 64.1 |
| 2* | −6.262 | 1.42 | — | — |
| 3 | ∞ | 1.2 | 1.57346 | — |
| | | (protective layer of optical disc) | | |
| 4 | ∞ | — | — | — |

**marked surface is diffraction lens surface.
Data of surface shape of diffraction lens:
Δ t = −0.00153,
r(m) = 1.864 + 0.00052 × m,
K = −0.550,
A4 = 0.585707 × 10⁻⁵,
A6(m) = (7.89966 − 0.0350 × m) × 10⁻⁵,
A8 = 0.603374 × 10⁻⁶,
A10(m) = (−4.60775 + 0.0104 × m) × 10⁻⁵.

| | m |
|---|---|
| 0.0 ≦ H < 0.2708 | 0 |
| 0.2708 ≦ H < 0.4680 | 1 |
| 0.4680 ≦ H < 0.6029 | 2 |
| 06029 ≦ H < 0.7117 | 3 |
| 0.7117 ≦ H < 0.8053 | 4 |

TABLE 2-continued

| | |
|---|---|
| $0.8053 \leq H < 0.8883$ | 5 |
| $0.8883 \leq H < 0.9636$ | 6 |
| $0.9636 \leq H < 1.0329$ | 7 |
| $1.0329 \leq H < 1.0973$ | 8 |
| $1.0973 \leq H < 1.1577$ | 9 |
| $1.1577 \leq H < 1.2146$ | 10 |
| $1.2146 \leq H < 1.2685$ | 11 |
| $1.2685 \leq H < 1.3199$ | 12 |
| $1.3199 \leq H < 1.3690$ | 13 |
| $1.3690 \leq H < 1.4160$ | 14 |
| $1.4160 \leq H < 1.4612$ | 15 |
| $1.4612 \leq H < 1.5047$ | 16 |
| $1.5047 \leq H < 1.5467$ | 17 |
| $1.5467 \leq H < 1.5873$ | 18 |
| $1.5873 \leq H < 1.6266$ | 19 |
| $1.6266 \leq H < 1.6648$ | 20 |
| $1.6648 \leq H < 1.7018$ | 21 |
| $1.7018 \leq H < 1.7378$ | 22 |
| $1.7378 \leq H < 1.7728$ | 23 |
| $1.7728 \leq H < 1.8070$ | 24 |

*marked surface is aspherical.
NO.2: $K = 0.0$; $A4 = 0.16787 \times 10^{-3}$; $A6 = -0.29578 \times 10^{-4}$; $A8 = 0.12030 \times 10^{-5}$; $A10 = 0.27705 \times 10^{-5}$.

TABLE 3

Data of condenser lens 13
f = 20.88 mm

| surface No. | r | d | N | ν |
|---|---|---|---|---|
| 1 | 14.095 | 2.00 | 1.67496 | 31.1 |
| 2 | ∞ | — | — | — |

Figure 5:
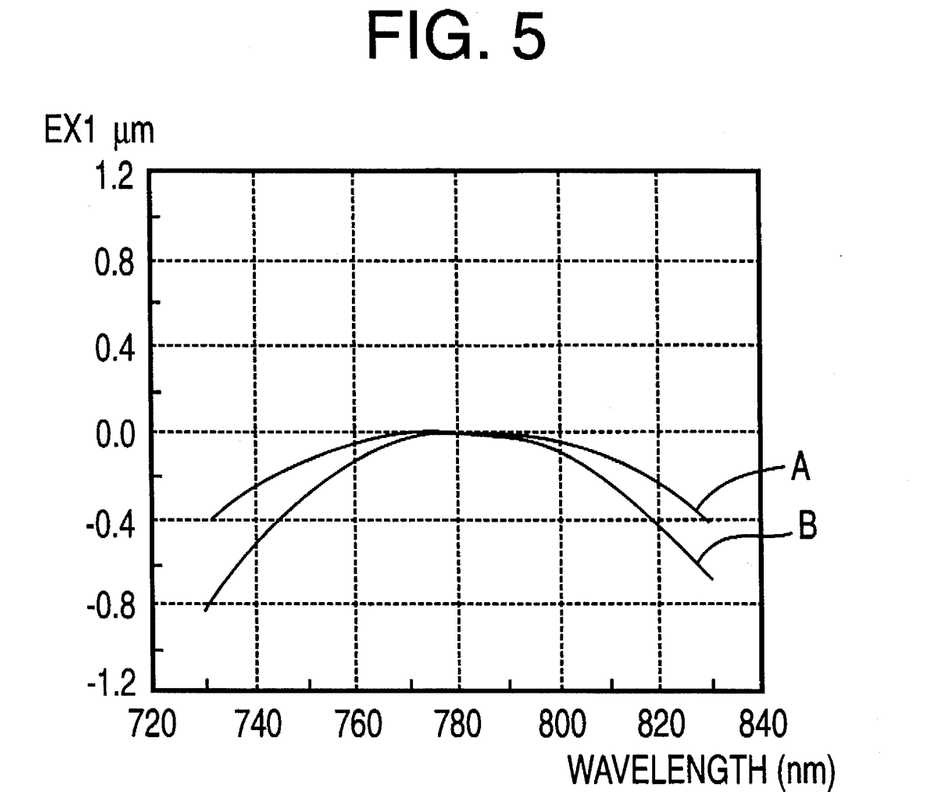
FIG. 5 is a diagram showing a relationship between axial chromatic aberrations on an optical disc and a correction of the axial chromatic aberrations wherein residual chromatic aberrations of beams emitted from a condenser lens is represented by focus error signals.
Figure 6:
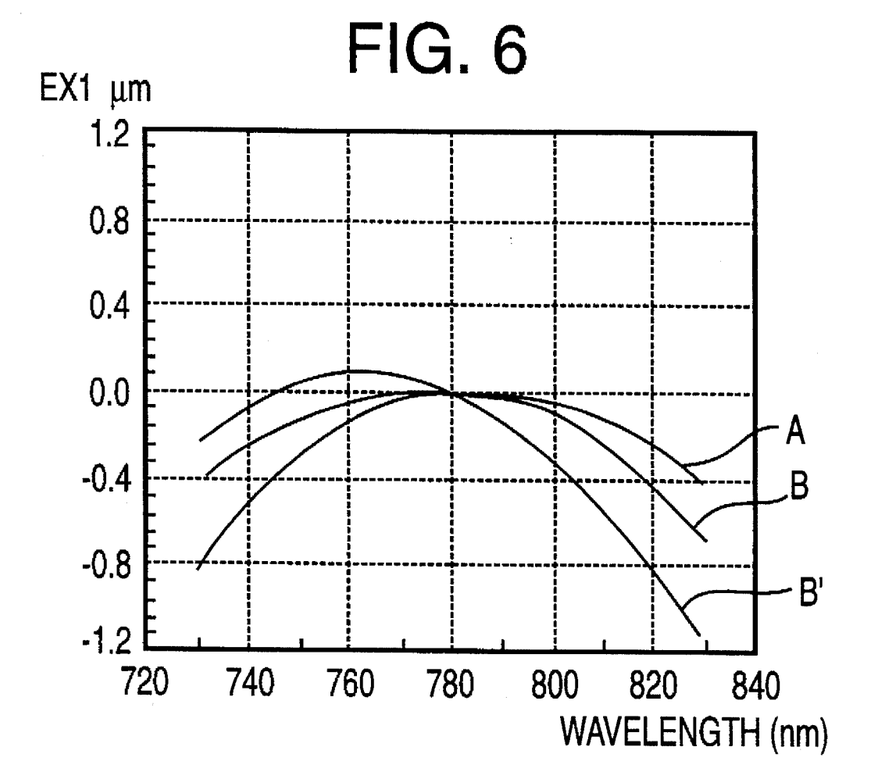
FIG. 6 is a diagram of a correction of the axial chromatic aberrations wherein residual chromatic aberrations of beams emitted from condenser lenses having different Abbe numbers is represented by focus error signals.

The curve "A" in FIGS. 5 and FIG. 6 shows the resultant axial chromatic aberration of the collimating lens 11 and the diffraction type single chromatic aberration correcting lens 12D on the data recording surface 14a. The curve "B" in FIG. 5 and FIG. 6 shows the focus error signals of light reflected from the data recording surface 12a and emitted through the condenser lens 13, which are represented by axial chromatic aberrations in terms of residual chromatic aberrations of the collimating lens 11, the objective lens 12 and the condenser lens 13. As can be seen from FIG. 5, the axial chromatic aberration and the fluctuation of the focus error signal are remarkably restricted even when the wavelength varies with respect to the reference wavelength.

In FIG. 6, the curve "B'" shows the axial chromatic aberrations corresponding to the curve "B" in FIG. 5, when the condenser lens 13 is replaced with a condenser lens whose focal length "f" and refractive index "n" are identical to those of the condenser lens 13, but whose Abbe number "ν" (=55.5) is greater than that of the condenser lens 13. Comparing the curves "B" and "B'" it can be understood that if the Abbe number of the condenser lens 13 is greater than that of the collimating lens 11, the focus error signal undesirably fluctuates even when the image is in focus.

Figure 7:
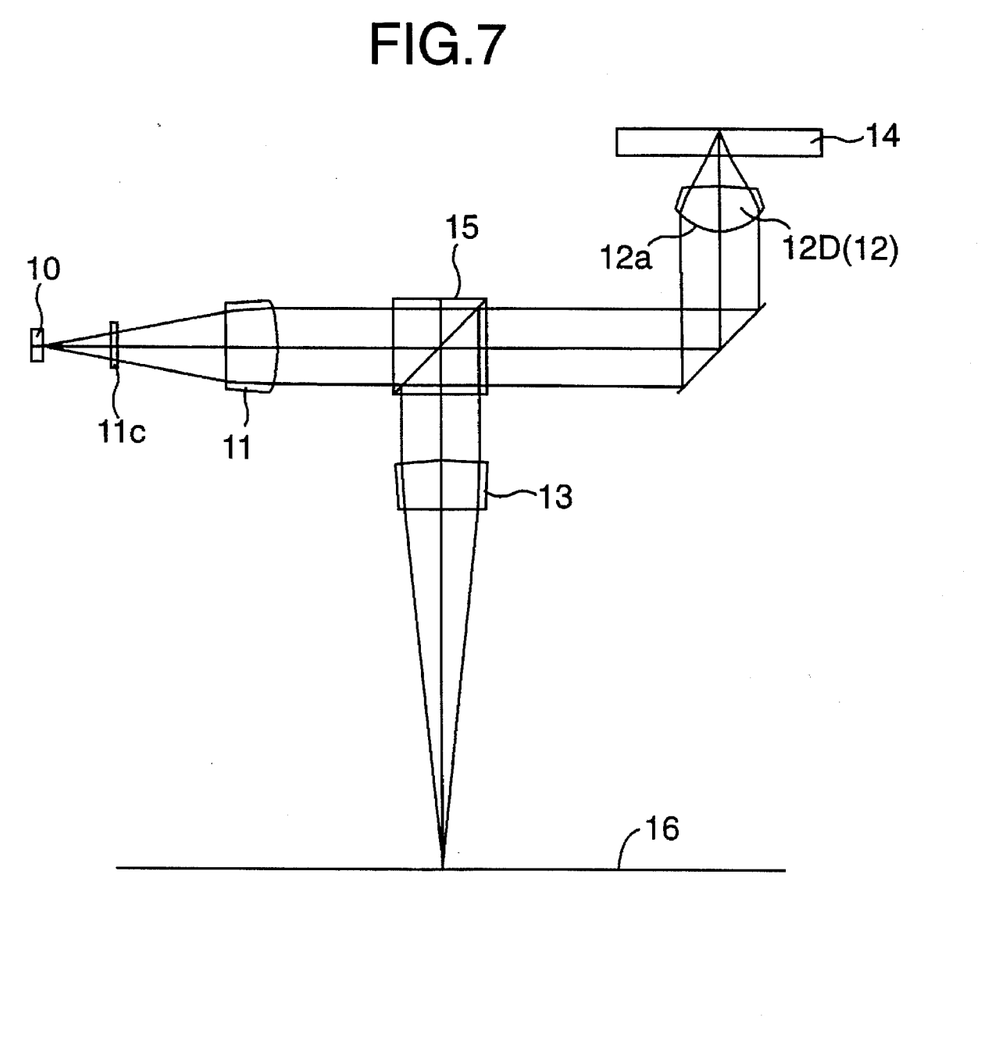
FIG. 7 is a schematic view of an optical system in an optical data recording and reproducing apparatus, according to a second embodiment of the present invention.
Figure 8:
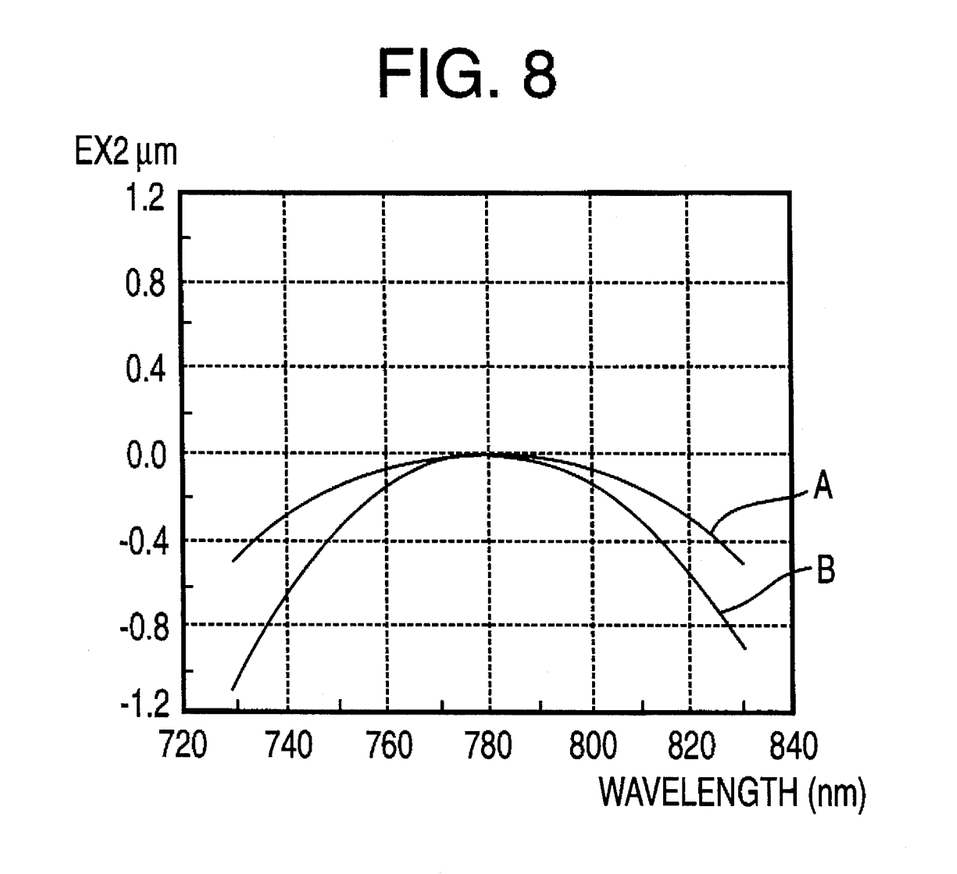
FIG. 8 is a diagram corresponding to FIG. 5, for the optical system shown in FIG. 7.

Second Embodiment:

Similar to the first embodiment, the objective lens 12 shown in FIG. 7 (second embodiment) is made of a diffraction type of single chromatic aberration correcting lens 12D. FIG. 8 shows the axial chromatic aberration, corresponding to FIG. 5.

Numerical data of the lenses shown in FIG. 7 is shown in Tables 4, 5 and 6 below.

TABLE 4

Data of collimating lens 11 (including glass cover 11 c)
f = 9.00 mm
Distance between a light emitting point of semiconductor laser 10 and the third surface of the lens: 7.83 mm

| surface No. | r | d | N | ν |
|---|---|---|---|---|
| 1 | ∞ | 0.25 | 1.51072 | 64.1 |
| | | (glass cover) | | |
| 2 | ∞ | — | — | — |
| 3* | 2 | 1.884 | 2.25 | 1.48617 | 57.4 |
| 4* | — | 5.285 | — | — |

*marked surface is aspherical.
NO.3: $K = 0.0$, $A4 = 0.0$, $A6 = 0.45610 \times 10^{-6}$,
$A8 = -0.94040 \times 10^{-8}$, $A10 = 0.0$
NO:4: $K = -0.5900$, $A4 = 0.22838 \times 10^{-5}$, $A6 = 0.25090 \times 10^{-6}$, * $A8 = 0.11297 \times 10^{-7}$, $A10 = 0.0$.

TABLE 5 data of a diffraction type of single chromatic aberration correcting lens
f = 3.00 mm

| surface No. | r | d | N | ν |
|---|---|---|---|---|
| 1** | — | 1.80 | 1.66089 | 55.4 |
| 2* | -14.063 | 1.26 | — | — |
| 3 | ∞ | 1.2 | 1.57346 | — |
| | | (protective layer of optical disc) | | |
| 4 | ∞ | — | — | — |

**marked surface is diffraction lens surface.
Data of surface shape of diffraction type lens:
$\Delta t = -0.00118$,
$r(m) = 2.191 + 0.00047 \times m$,
$K = -0.588$,
$A4 = 0.14279 \times 10^{-4}$,
$A6(m) = (5.9575 - 0.0481 \times m) \times 10^{-5}$,
$A8 = 0.150424 \times 10^{-6}$,
$A10(m) = (-3.0485 + 0.0081 \times m) \times 10^{-5}$.

| | m |
|---|---|
| $0.0 \leq H < 0.25509$ | 0 |
| $0.25509 \leq H < 0.44113$ | 1 |
| $0.44113 \leq H < 0.56862$ | 2 |
| $0.56862 \leq H < 0.67177$ | 3 |
| $0.67177 \leq H < 0.76056$ | 4 |
| $0.76056 \leq H < 0.83957$ | 5 |
| $0.83957 \leq H < 0.91135$ | 6 |
| $0.91135 \leq H < 0.97750$ | 7 |
| $0.97750 \leq H < 1.03910$ | 8 |
| $1.03910 \leq H < 1.09693$ | 9 |
| $1.09693 \leq H < 1.15156$ | 10 |
| $1.15156 \leq H < 1.20343$ | 11 |
| $1.20343 \leq H < 1.25289$ | 12 |
| $1.25289 \leq H < 1.30021$ | 13 |
| $1.30021 \leq H < 1.34563$ | 14 |
| $1.34563 \leq H < 1.38934$ | 15 |
| $1.38934 \leq H < 1.43149$ | 16 |
| $1.43149 \leq H < 1.47223$ | 17 |
| $1.47223 \leq H < 1.51167$ | 18 |
| $1.51167 \leq H < 1.54991$ | 19 |
| $1.54991 \leq H < 1.58704$ | 20 |
| $1.58704 \leq H < 1.62315$ | 21 |
| $1.62315 \leq H < 1.65829$ | 22 |
| $1.65829 \leq H < 1.69254$ | 23 |
| $1.69254 \leq H < 1.72595$ | 24 |
| $1.72595 \leq H < 1.75857$ | 25 |
| $1.75857 \leq H < 1.79045$ | 26 |
| $1.79045 \leq H < 1.82162$ | 27 |

*marked surface is aspherical.
NO.2  $K = 0.0$, $A4 = 0.88505 \times 10^{-4}$, $A6 = -0.17184 \times 10^{-4}$, $A8 = -0.39958 \times 10^{-5}$, $A10 = 0.12653 \times 10^{-5}$.

TABLE 6

| | Data of condenser lens 13 f = 16.36 mm | | | |
|---|---|---|---|---|
| surface No. | r | d | N | ν |
| 1 | 11.200 | 2.00 | 1.68443 | 30.1 |
| 2 | ∞ | | | |

Figure 9:
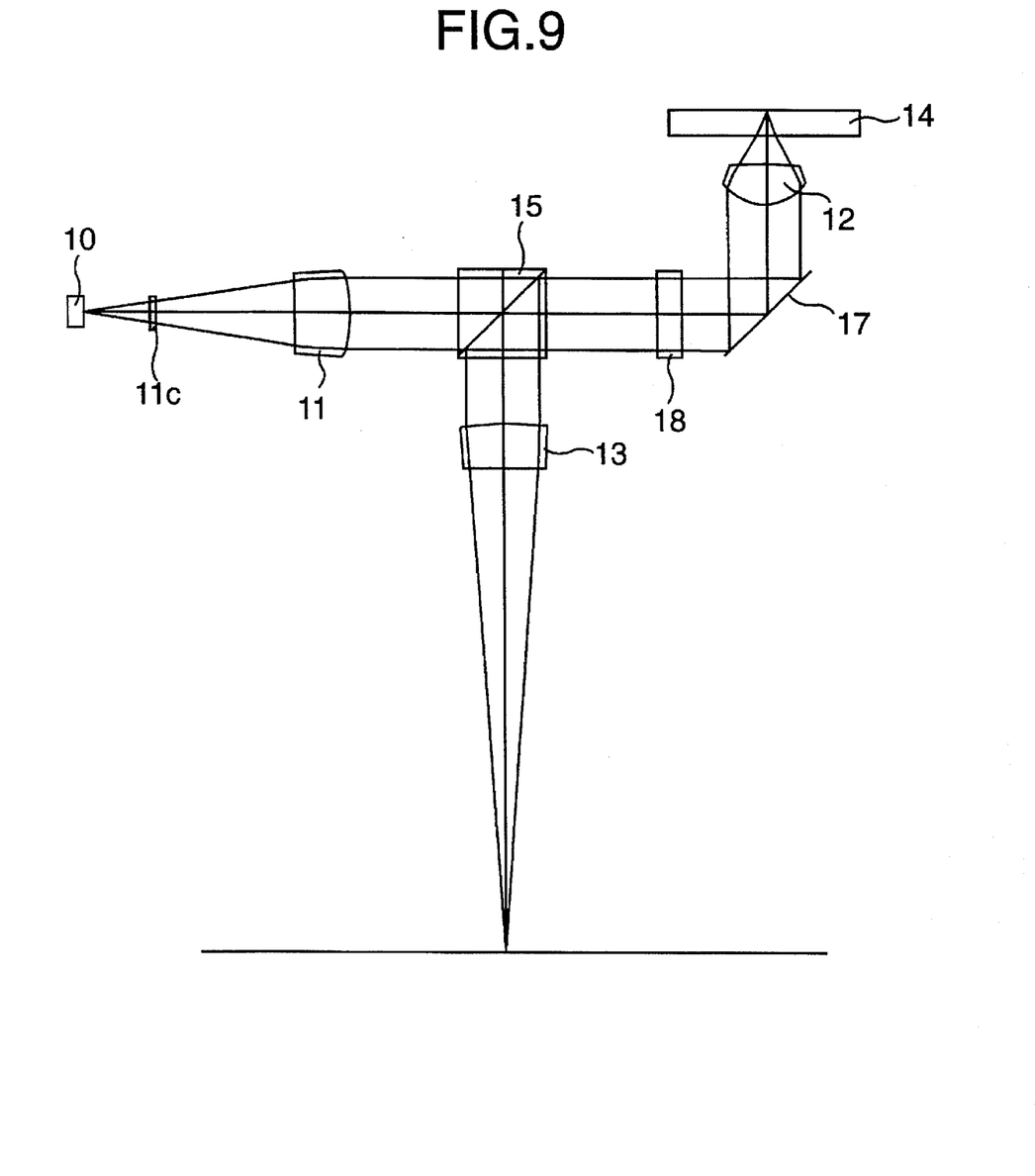
FIG. 9 is a schematic view of an optical system in an optical data recording and reproducing apparatus, according to a third embodiment of the present invention.

Third Embodiment:

In the third embodiment illustrated in FIG. 9, the objective lens 12 is made of a single lens which does not correct the chromatic aberration. A diffracting chromatic aberration correcting element 18 is inserted between the beam splitter 15 and the mirror 17. The objective lens 12 and the separated type of diffracting chromatic aberration correcting element 18 perform an over correction of the chromatic aberration caused by the collimating lens 11. In other words, the diffracting chromatic aberration correcting element 18 corrects the chromatic aberration caused by the collimating lens 11 and the objective lens 12. The diffracting chromatic aberration correcting element 18 is equivalent to an optical element obtained by replacing the diffracting lens surface 12a (having a pattern of stepped concentrical rings) of the diffraction type of single chromatic aberration correcting lens 12D with a planar lens surface. Namely, light having the reference wavelength has no phase difference due to the diffracting chromatic aberration correcting element 18, but the diffracting chromatic aberration correcting element 18 diverges light having the wavelength shorter than the reference wavelength and converges light having the wavelength longer than the reference wavelength in such a way that the degree of divergence and the degree of convergence increase as the wavelength decreases and increases, respectively.

Figure 10:
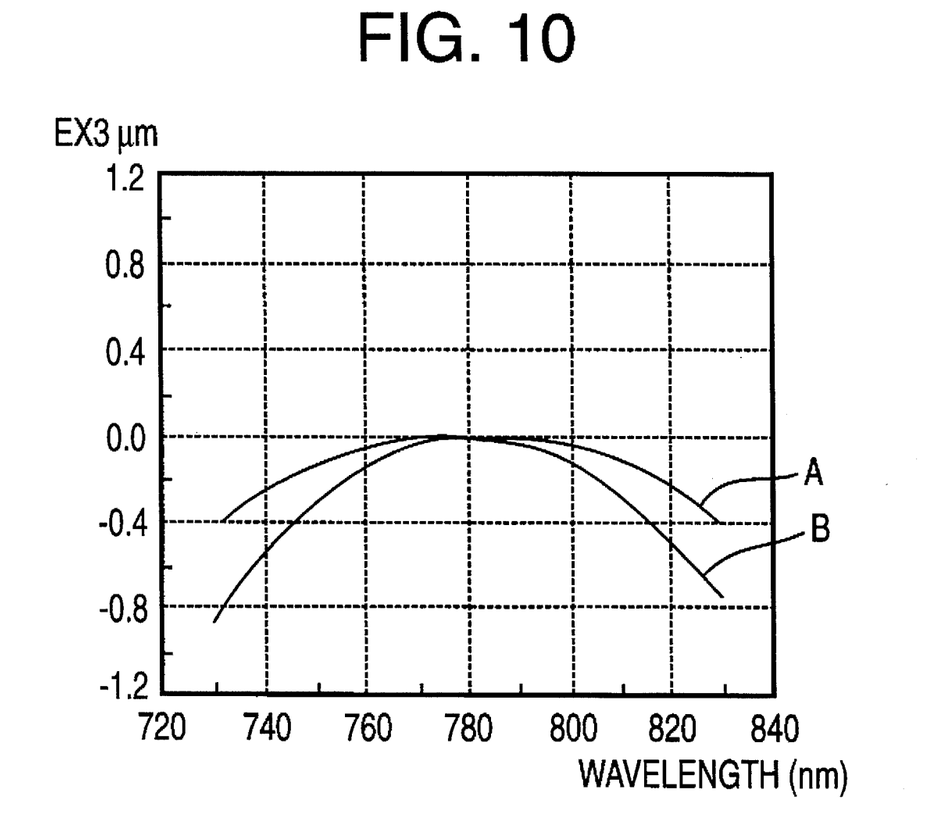
FIG. 10 is a diagram corresponding to FIG. 9, for the optical system shown in FIG. 9.

FIG. 10 shows the axial chromatic aberrations corresponding to FIGS. 5 or 8. Numerical data of the lenses and optical elements in the third embodiment is shown in Tables 7 through 10 below.

TABLE 7

| | Data of collimating lens 11 (including glass cover 11 c) f = 11.00 mm Distance between a light emitting point of semiconductor laser and the third surface of the lens: 9.53 mm. | | | |
|---|---|---|---|---|
| surface No. | r | d | N | ν |
| 1 | ∞ | 0.25 | 1.51072 | 64.1 |
| | | | (glass cover) | |
| 2 | ∞ | — | — | — |
| 3* | 32.851 | 2.75 | 1.51072 | 64.1 |
| 4* | −6.585 | — | — | — |

*marked surface is aspherical.
NO.3: $K = 0.0$, $A4 = 0.0$, $A6 = 0.12110 \times 10^{-6}$, $A8 = -0.20102 \times 10^{-8}$, $A10 = 0.0$.
NO.4: $K = -0.5300$, $A4 = 0.12223 \times 10^{-5}$, $A6 = 0.70623 \times 10^{-7}$, $A8 = 0.16748 \times 10^{-8}$, $A10 = 0.0$.

TABLE 8

| | Data of diffracting chromatic aberration correcting element 18 | | | |
|---|---|---|---|---|
| surface No. | r | d | N | ν |
| 1** | ∞ | 1.00 | 1.51072 | 64.1 |
| 2 | ∞ | | | |

TABLE 8-continued

**marked surface is diffraction lens surface.
Data of surface shape of diffraction surface:
$\Delta t = -0.00153$.

| | m |
|---|---|
| 0.0 ≦ H < 0.27877 | 0 |
| 0.27877 ≦ H < 0.48179 | 1 |
| 0.48179 ≦ H < 0.62065 | 2 |
| 0.62065 ≦ H < 0.73281 | 3 |
| 0.73281 ≦ H < 0.82918 | 4 |
| 0.82918 ≦ H < 0.91480 | 5 |
| 0.91480 ≦ H < 0.99246 | 6 |
| 0.99246 ≦ H < 1.06392 | 7 |
| 1.06392 ≦ H < 1.13037 | 8 |
| 1.13037 ≦ H < 1.19266 | 9 |
| 1.19266 ≦ H < 1.25141 | 10 |
| 1.25141 ≦ H < 1.30712 | 11 |
| 1.30712 ≦ H < 1.36017 | 12 |
| 1.36017 ≦ H < 1.41086 | 13 |
| 1.41086 ≦ H < 1.45946 | 14 |
| 1.45946 ≦ H < 1.50616 | 15 |
| 1.50616 ≦ H < 1.55115 | 16 |
| 1.55115 ≦ H < 1.59457 | 17 |
| 1.59457 ≦ H < 1.63657 | 18 |
| 1.63657 ≦ H < 1.67724 | 19 |
| 1.67724 ≦ H < 1.71669 | 20 |
| 1.71669 ≦ H < 1.75502 | 21 |
| 1.75502 ≦ H < 1.79228 | 22 |
| 1.79228 ≦ H < 1.82856 | 23 |

TABLE 9

| | Data of objective lens 12 f = 3.00 mm | | | |
|---|---|---|---|---|
| surface No. | r | d | N | ν |
| 1* | 2.094 | 1.80 | 1.61139 | 63.4 |
| 2* | −9.959 | 1.26 | — | — |
| 3 | ∞ | 1.20 | 1.57346 | — |
| | | (protective layer of optical disc) | | |
| 4 | ∞ | — | — | — |

*marked surface is aspherical.
NO.1: $K = -0.642$, $A4 = 0.22410 \times 10^{-4}$, $A6 = 0.16361 \times 10^{-5}$, $A8 = 0.32969 \times 10^{-8}$, $A10 = -0.30072 \times 10^{-6}$.
NO.2: $K = 0.0$, $A4 = 0.12012 \times 10^{-3}$, $A6 = -0.23399 \times 10^{-4}$, $A8 = -0.19418 \times 10^{-5}$, $A10 = 0.93423 \times 10^{-6}$.

TABLE 10

| | Data of condenser lens 13 f = 23.23 mm | | | |
|---|---|---|---|---|
| surface No. | r | d | N | ν |
| 1 | 18.250 | 2.00 | 1.79117 | 39.6 |
| 2 | ∞ | | | |

Figure 11:
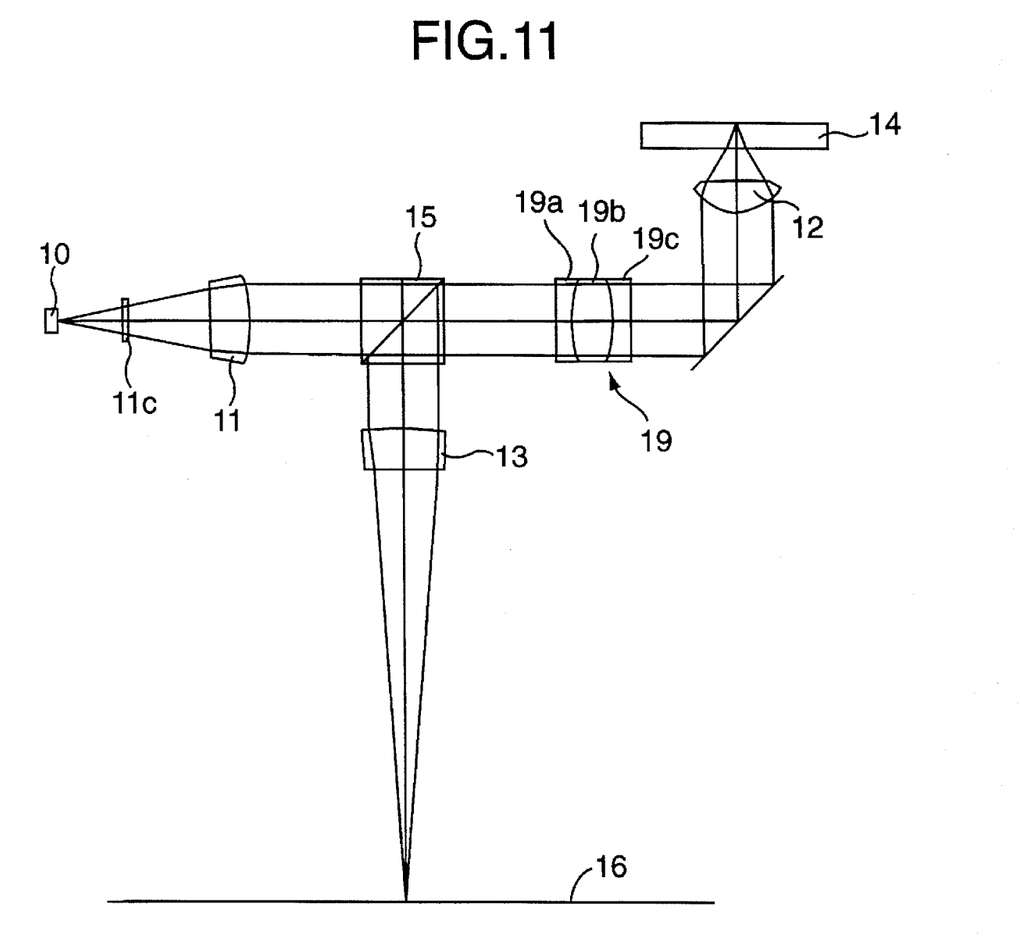
FIG. 11 is a schematic view of an optical system in an optical data recording and reproducing apparatus, according to a fourth embodiment of the present invention; and, FIG. 12 is a diagram corresponding to FIG. 5, for the optical system shown in FIG. 11.

Fourth Embodiment:

In the fourth embodiment illustrated in FIG. 11, the objective lens 12 is made of a single lens which does not correct the chromatic aberration. A cemented lens 19 for correcting the chromatic aberration is inserted between the beam splitter 15 and the mirror 17. The cemented lens 19 is comprised of a negative lens 19a, a positive lens 19b, and a negative lens 19c, that are all integrally cemented. The cemented lens 19 performs an over correction of the chromatic aberration caused by the collimating lens 11, similar to the diffracting chromatic aberration correcting element 18.

Figure 12:
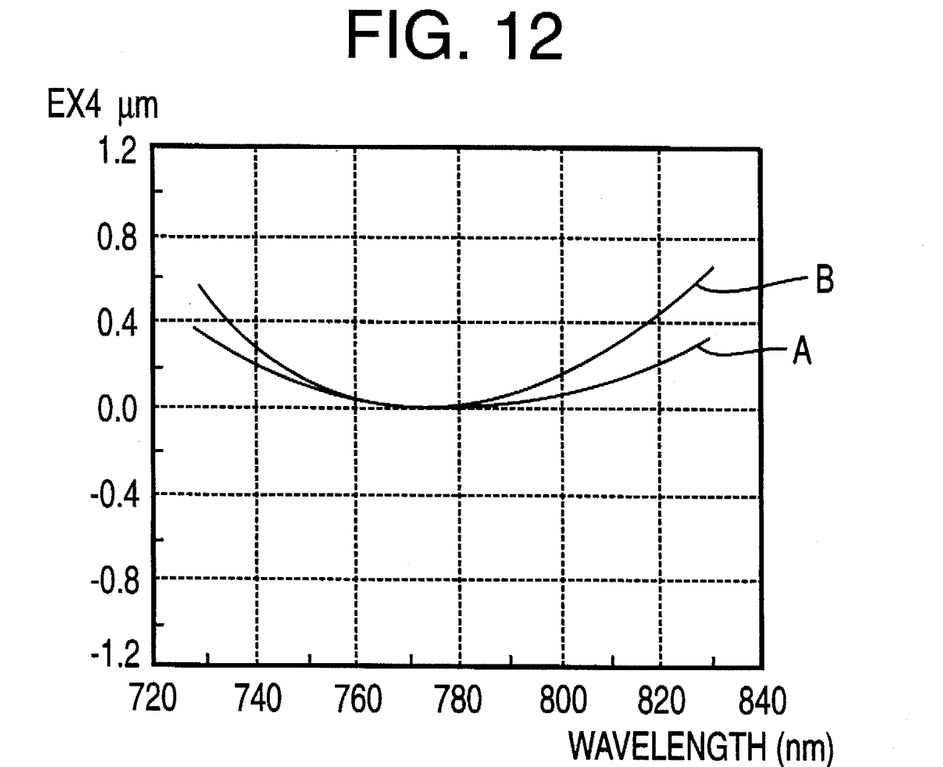

FIG. 12 shows the axial chromatic aberrations corresponding to FIGS. 5, FIG. 8, or FIG. 10. Numerical data of the lenses and optical elements in the fourth embodiment is shown in Tables 11 through 14 below.

TABLE 11

Data of collimating lens 11 (including glass cover 11 c)
f = 8.00 mm
Distance between a light emitting point of semiconductor laser and the third surface of the lens: 7.00 mm

| surface No. | r | d | N | v |
|---|---|---|---|---|
| 1 | ∞ | 0.25 | 1.51072 | 64.1 |
|   |   | (glass cover) |   |   |
| 2 | ∞ | — | — | — |
| 3* | 13.337 | 2.00 | 1.43107 | 95.0 |
| 4* | −4.441 | — | — | — |

*marked surface is aspherical.
NO.3: $K = 0.0, A4 = 0.0, A6 = 0.77473 \times 10^{-6}$, $A8 = 0.97834 \times 10^{-7}, A10 = 0.0$.
NO.4: $K = -0.7840, A4 = 0.26953 \times 10^{-5}, A6 = 0.54087 \times 10^{-6}, A8 = 0.41566 \times 10^{-7}, A10 = 0.93681 \times 10^{-8}$.

TABLE 12

Data of cemented lens 19

| surface No. | r | d | N | v |
|---|---|---|---|---|
| 1 | ∞ | 0.80 | 1.73166 | 25.1 |
| 2 | 4.095 | 2.00 | 1.73145 | 52.7 |
| 3 | −4.095 | 0.80 | 1.73166 | 25.1 |
| 4 | ∞ | | | |

TABLE 13 data of an objective lens 12
f = 3.00 mm

| surface No. | r | d | N | v |
|---|---|---|---|---|
| 1* | 1.864 | 1.50 | 1.51072 | 64.1 |
| 2* | −6.262 | 1.42 | — | — |
| 3 | ∞ | 1.20 | 1.57346 | — |
|   |   | (protective layer of optical disc) |   |   |
| 4 | ∞ | — | — | — |

*marked surface is aspherical.
NO.1: $K = -0.550, A4 = 0.58571 \times 10^{-5}, A6 = 0.78997 \times 10^{-6}, A8 = 0.60337 \times 10^{-6}, A10 = -0.46078 \times 10^{-6}$.
NO.2: $K = 0.0, A4 = 0.16787 \times 10^{-3}, A6 = -0.29578 \times 10^{-4}, A8 = 0.12030 \times 10^{-5}, A10 = 0.27705 \times 10^{-5}$.

TABLE 14

Data of condenser lens 13
f = 20.88 mm

| surface No. | r | d | N | v |
|---|---|---|---|---|
| 1 | 14.095 | 2.00 | 1.67496 | 31.1 |
| 2 | ∞ | | | |

As may be understood from the above discussion, according to the present invention, the chromatic aberrations in an optical data recording and reproducing apparatus can be easily eliminated by a simple mechanism. Moreover, little or no deviation of a beam spot position is caused on a data recording surface by the deviation or inclination of the optical axis of the collimating lens. Furthermore, if a beam separator is provided between the collimating lens and the objective lens to separate return light beams reflected from the data recording surface from the optical path of incident light to the data recording surface, so that the separated return light is converged onto a light receiving element by a condenser lens, it is not necessary for the condenser lens to correct the chromatic aberration.

We claim:

1. An optical data recording and reproducing apparatus, comprising;

a laser source;

a collimating lens having a positive power to collimate divergent laser beams emitted from said laser source; and an objective lens adapted to converge the beams collimated by said collimating lens onto a data recording surface of a data recording medium; wherein, said collimating lens is a single lens; and said objective lens is provided with an over correction of chromatic aberration to reduce a back focal distance of said objective lens as a wavelength increases to thereby cancel a chromatic aberration of said collimating lens.

2. An optical data recording and reproducing apparatus according to claim 1, further comprising a beam separator disposed between said collimating lens and said objective lens for separating return beams reflected from said data recording surface from light beams incident on said data recording surface.

3. An optical data recording and reproducing apparatus according to claim 2, further comprising a condenser lens in an optical path of said separated return beams to form an image of said return beams onto a light receiving element.

4. An optical data recording and reproducing apparatus according to claim 3, wherein said condenser lens is a single lens.

5. An optical data recording and reproducing apparatus according to claim 1, wherein said objective lens is a single lens having at least one diffracting lens surface having a pattern of stepped concentric rings, said stepped concentric rings having a stepped discontinuous cross section at the boundaries of said concentric rings.

6. An optical data recording and reproducing apparatus according to claim 4, wherein the following formulae are satisfied:

$$f1 < f3, \text{ and}$$

$$v1 > v3,$$

wherein f1 represents a focal length of the collimating lens, f3 represents a focal length of the condenser lens, v1 represents an Abbe number of the collimating lens, and v3 represents an Abbe number of the condenser lens.

* * * * *